R. W. BIDDLECOM AND L. B. GIRARD.
AUTOMOBILE TOP CONVERTER.
APPLICATION FILED MAR. 11, 1919.
1,377,388.
Patented May 10, 1921.
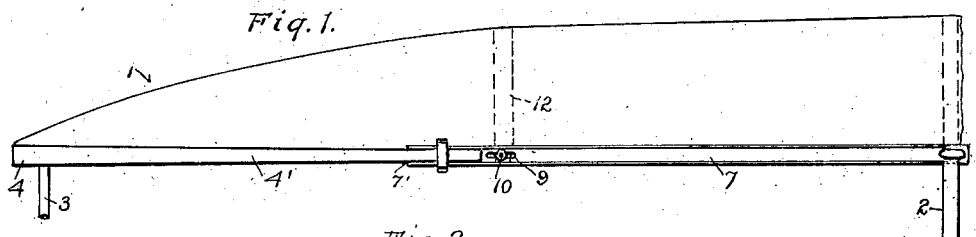
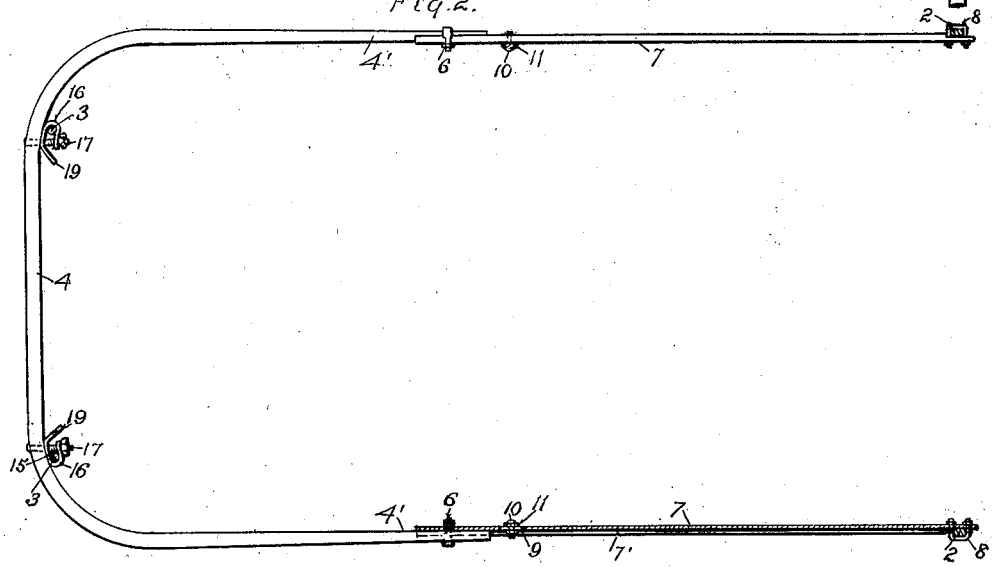
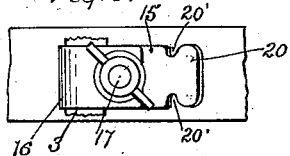
INVENTORS:
Roy W. Biddlecom
Louis B. Girard
BY Arthur P. Knight
ATTORNEY

UNITED STATES PATENT OFFICE.

ROY W. BIDDLECOM AND LOUIS B. GIRARD, OF LOS ANGELES, CALIFORNIA.

AUTOMOBILE-TOP CONVERTER.

1,377,388. Specification of Letters Patent. Patented May 10, 1921.

Application filed March 11, 1919. Serial No. 281,960.

*To all whom it may concern:*

Be it known that we, ROY W. BIDDLECOM and LOUIS B. GIRARD, citizens of the United States, residing at Los Angeles, in the county of Los Angeles and State of California, have invented a new and useful Automobile-Top Converter, of which the following is a specification.

This invention relates to means for converting automobile tops to the new type in which the middle uprights of the ordinary old style tops are eliminated, and the main object of the invention is to provide effective and simple means for this purpose, which will utilize as much as possible of the old construction.

The accompanying drawings illustrate an embodiment of our invention, and referring thereto:

Figure 1 is a side elevation of an automobile top provided with our invention;

Fig. 2 is a partly sectional plan view of the frame of the converted top;

Fig. 3 is a rear elevation of the clamp for the front post.

Referring to Fig. 1 the automobile top, indicated at 1, is mounted on side and front posts, or uprights, 2 and 3. The top 1 is mounted at its front end on a horizontal bow or frame member 4, extending transversely of the vehicle and having rearward extensions 4' whose rear ends are ordinarily connected to the middle uprights at the side of the machine. In our improved construction this rearward extension 4' is cut off somewhat forward of the location of the middle posts or uprights and is clamped by suitable clamping means 6 to reachbar or extension 7, extending rearwardly to the rear upright 2 and clamped thereto by clamp means 8. The clamp means 6 and 8 are preferably formed as stirrups or U bolts embracing said extension bar and said rearward extension 4' and engaging the outer face of said rearward extension to hold the parts in position. Extension bar 7 is preferably formed as a channel iron member and is provided with a longitudinal slot 9 to receive a bolt 10 whereby it is secured to a strap member 11, fastened to a cross-frame member 12 of the top, this cross-frame member being the one which is mounted in ordinary construction on the top of the middle uprights, which are eliminated in this construction. The slot 9 provides for variations in the location of this top frame member in different machines. The rear end portion of the rearward extension 4' is generally rounded and fits and engages in the channel 7' of the extension bar 7.

The front frame member 4 is provided with means for attachment to the top of the front upright 3 at each side, said means consisting preferably of a clamp 15 formed as a U member of resilient metal having one leg screwed to said front frame member and having the other leg adjustable by means of the screw 17 connecting said two legs so as to enable the front upright 3 to be clamped in the bend 16 of said U member, the clamp is preferably provided with an extension 19, on one arm thereof extending obliquely rearward and away from the front frame member 4 and notched at 20' near its outer end to form an enlargement or head 20 adapted to serve as a button for the attachment of a curtain.

What we claim is:

1. An automobile top converter comprising a front frame member having rearward extensions, an extension bar extending rearwardly from each rearward extension of said front frame member, clamping means for securing said extension bar on said rearward extension, clamping means at the rear ends of each extension bar for securing same to an upright supporting member, and clamping means on the front frame member for securing the same to the front upright supporting members, said last named clamping means being formed as a resilient U-member adapted to embrace the front upright supporting member and provided with a clamp screw for tightening the same, and with an extension projecting away from the front frame member and having a head serving as a button for attachment of a curtain.

2. An automobile top converter, comprising a front frame member extending across the front end of the top and having rearward extensions formed rigidly and integrally therewith, an extension bar extending rearwardly from each rearward extension of said front frame member and formed as a channel bar, the said rearward extension of the front frame member being rounded and fitting and engaging the channel of said channel bar, a U-bolt embracing each of said extensions of the front frame member and the corresponding channel bar and engaging the outer face of the said front frame member extension to secure said parts together, said channel bar having a longitudinal slot at its forward portion, means extending through said slot and engaging with the channel bar for clamping the channel bar to a supporting member of the automobile top, clamping means at the rear end of the channel bar for securing the same to an upright supporting member and clamping means on the front frame member for securing the same to front upright supporting members.

In testimony whereof we have hereunto subscribed our names this 28th day of February 1919.

ROY W. BIDDLECOM.
LOUIS B. GIRARD.